(12) United States Patent
Johnson et al.

(10) Patent No.: US 7,128,512 B2
(45) Date of Patent: Oct. 31, 2006

(54) PANEL FASTENER SYSTEM

(75) Inventors: Lawrence W. Johnson, Taylor, MI (US); John M. Kosidlo, White Lake, MI (US)

(73) Assignee: Illinois Tool Works, Inc., Glenview, IL (US)

( * ) Notice: Subject to any disclaimer, the term of this patent is extended or adjusted under 35 U.S.C. 154(b) by 132 days.

(21) Appl. No.: 10/419,348

(22) Filed: Apr. 21, 2003

(65) Prior Publication Data

US 2004/0052607 A1   Mar. 18, 2004

Related U.S. Application Data

(60) Provisional application No. 60/411,061, filed on Sep. 16, 2002.

(51) Int. Cl.
*F16B 37/02* (2006.01)
(52) U.S. Cl. ............... 411/173; 411/172; 411/182
(58) Field of Classification Search ......... 411/111, 411/112, 113, 85, 174, 175, 549, 551, 552, 411/553, 349, 172, 173, 182, 84
See application file for complete search history.

(56) References Cited

U.S. PATENT DOCUMENTS

| | | | |
|---|---|---|---|
| 2,395,650 A | | 2/1946 | Allen |
| 2,649,884 A | * | 8/1953 | Westover ............... 411/173 |
| 2,936,502 A | * | 5/1960 | Newcomer, Jr. ......... 411/549 |
| 3,035,624 A | * | 5/1962 | Jaworski .............. 411/112 |
| 3,091,272 A | * | 5/1963 | Patten ................ 411/112 |
| 3,304,980 A | | 2/1967 | Koehl |
| 3,361,175 A | * | 1/1968 | Koehl ................. 411/527 |
| 3,659,491 A | | 5/1972 | Duffy et al. |
| 3,712,357 A | | 1/1973 | Corbett et al. |
| 4,014,245 A | * | 3/1977 | Frye et al. ............ 411/352 |
| 4,227,722 A | * | 10/1980 | Barber ................ 411/553 |
| 4,460,299 A | | 7/1984 | Kowalski |
| 5,020,952 A | | 6/1991 | Zeigler et al. |
| 5,076,748 A | | 12/1991 | Waterfield et al. |
| 5,271,586 A | * | 12/1993 | Schmidt ............. 411/85 X |
| 5,368,427 A | * | 11/1994 | Pfaffinger ............ 411/553 |
| 5,833,417 A | * | 11/1998 | Sargent et al. .......... 411/85 |
| 6,193,455 B1 | | 2/2001 | Levey |
| 6,499,923 B1 | * | 12/2002 | LeVey ............... 411/85 X |
| 6,575,682 B1 | * | 6/2003 | Dohm et al. .......... 411/553 |

FOREIGN PATENT DOCUMENTS

JP   2001027216 A2   7/1999
JP   2002070827 A2   8/2000

* cited by examiner

*Primary Examiner*—William L. Miller
(74) *Attorney, Agent, or Firm*—Mark W. Croll, Esq.; Paul F. Donovan, Esq.; Levenfeld Pearlstein, LLC

(57) ABSTRACT

A fastener system for mounting to a panel includes a twist-in fastener that rotatably engages an opening in the panel. The fastener includes a fastener body defining an opening extending through the fastener body for receiving a mating fastener, a plurality of facets positioned around the fastener body opening for facilitating the mounting of the fastener onto the panel, and a fastener base. Panel-engaging members extend outwardly from the fastener base to rotatably mount the fastener through the panel opening and onto the panel. At least one anti-rotation member also extends outwardly from the fastener base to prevent the mounted fastener from backing out of the panel opening upon the removal of the mating fastener.

13 Claims, 3 Drawing Sheets

PANEL FASTENER SYSTEM

CROSS REFERENCE TO RELATED APPLICATION

This Non-Provisional Application claims benefit to U.S. Provisional Application Ser. No. 60/411,061 filed Sep. 16, 2002.

FIELD OF THE INVENTION

The present invention relates generally to fasteners and more particularly to panel fasteners that are used to secure items to panels.

BACKGROUND OF THE INVENTION

It is known to use panel fasteners for various applications. Conventional panel fasteners include a threaded nut that is anchored over an opening in a panel, and a bolt that is engageable with the threaded nut to secure a component or device to the panel. Typically, the threaded nut of the fastener is welded onto the panel and over the opening in the panel. Problems exist, however, with respect to welding fastener nuts onto panels. For instance, it is often difficult to properly locate and weld the fastener nut over the opening in the panel. In addition, it is often difficult to consistently and completely weld the nut onto the panel. Moreover, a large capital investment is required for equipment that will accurately locate and completely weld the fastener nut onto the panel.

Alternatively, another technique for securing a fastener to a panel includes force fitting the fastener into the opening in the panel. Drawbacks also exist with respect to this technique. For example, one known drawback with the force fitting technique is the potential for the panel to yield or deform under the force applied to the panel. In addition, as with the welding technique, the press fitting technique requires a large capital investment in equipment, such as hydraulic presses to press the fastener onto the panel. Still another drawback with this technique is that once the fastener is pressed into the panel opening, the fastener will back out or become detached from the panel upon the application of relatively low torque forces.

The present invention is directed at overcoming these and other known problems and disadvantages with existing techniques for anchoring fasteners to panels.

SUMMARY OF THE INVENTION

The present invention is directed to a fastener system that attaches easily to a panel. The fastener system of the invention includes a fastener nut that twists into an opening in the panel. A fastener bolt may then be threaded onto the fastener nut to mount a component or device to the panel. Once installed onto the panel, the fastener nut will not back-out of the opening in the panel when the fastener bolt is removed. Importantly, the fastener system of the present invention is more easily installed than known panel fasteners. The fastener system also provides weight and significant cost savings over fasteners that are welded or press fitted onto the panel.

Other features and advantages of the invention will become apparent to those skilled in the art upon review of the following detailed description, claims and drawings in which like numerals are used to designate like features.

Figure 1:
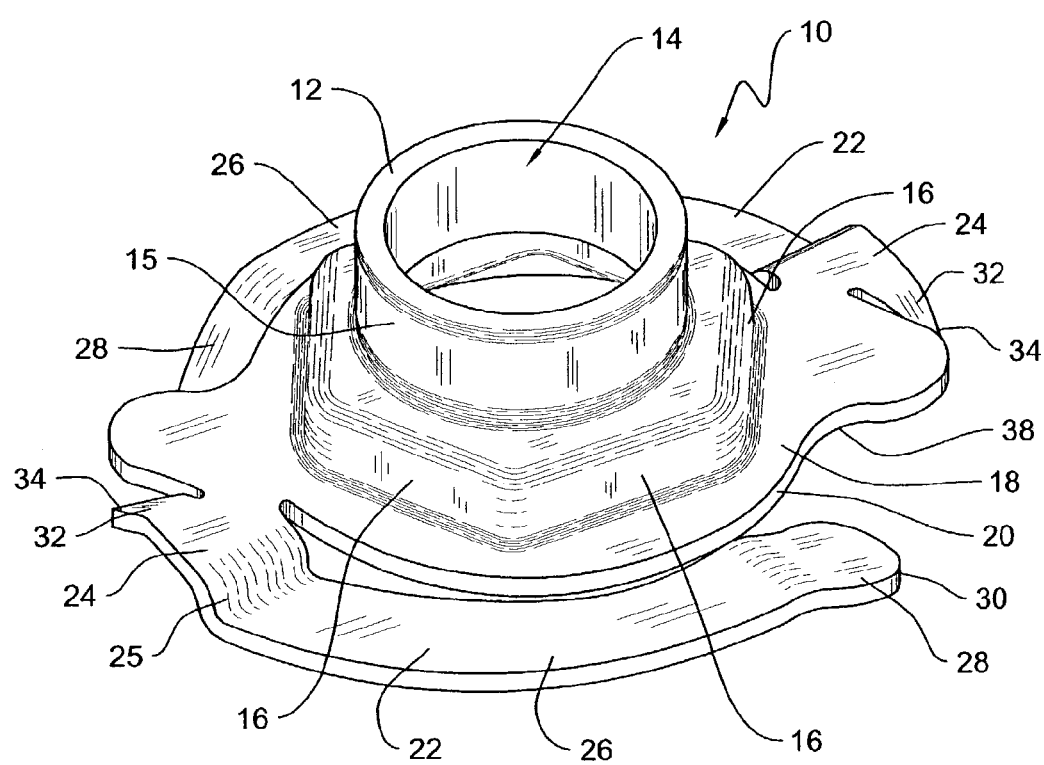
FIG. 1 shows an isometric view of the fastener of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "compromising" and variations thereof is meant to encompass the items listed thereafter and equivalents thereof as well as additional items and equivalents thereof.

DETAILED DESCRIPTION OF THE PREFERRED EMBODIMENTS

Figure 2:
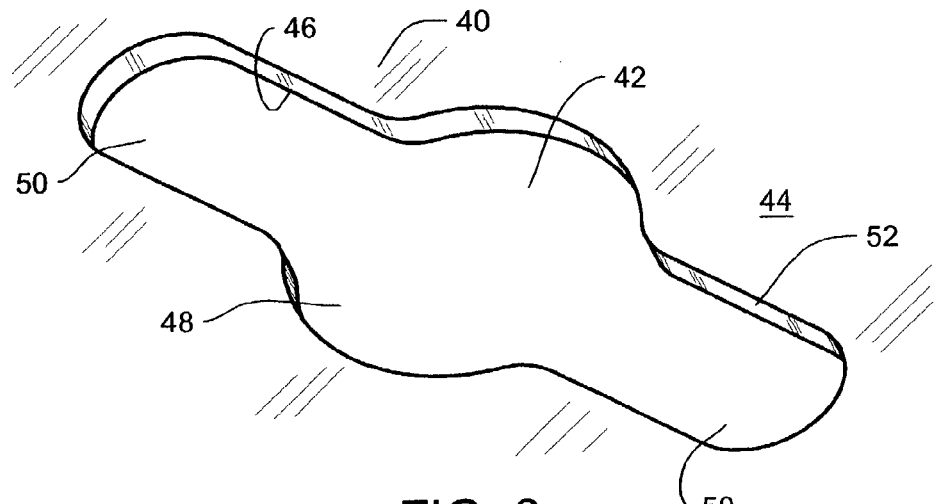
FIG. 2 shows an isometric view of the panel opening for installation of the fastener of FIG. 1.

Referring to FIGS. 1 and 2, in one embodiment, the fastener system of the present invention includes a fastener 10 depicted as a fastener nut. The fastener 10 is configured to mount to an opening 42 in a panel 40, as described below, and to receive a mating fastener through the panel opening 42 to mount components onto the panel 40. It should be understood that while the present invention is illustrated in the form of a fastener nut, the teachings of the invention may be embodied in the form of other types of fasteners or fastener components, including a bolt, screw, rod or similar fastener.

Referring to FIG. 1, in one embodiment, the fastener 10 includes a fastener body 12 defining a hole 14 extending through the fastener body 12. The hole 14 is formed by a cylindrical wall 15 and is configured to receive a mating fastener, not shown, to mount components onto the panel 40. The fastener body 12 further defines a plurality of facets 16 arranged in a hexagon around the periphery of the hole 14. A wrench or other tool may be used to engage the plurality of facets 16 to facilitate the installation of the fastener 10 onto the panel 40. While a hexagon shaped fastener body is depicted, it should be understood that other shapes and configurations are possible with the invention to facilitate the installation of the fastener 10 onto the panel 40.

Located below the plurality of facets 16 and formed integral with the fastener body 12 is a fastener base 18. As illustrated in FIG. 1, the fastener base 18 defines a generally circular configuration and a substantially planar bottom surface 38 for engaging the panel 40. The fastener base 18 also defines a peripheral edge 20. Extending tangentially from the peripheral edge 20 of the fastener base 18 are panel-engaging members 22 that assist in anchoring the fastener 10 to the panel 40. As depicted in FIG. 1, two panel-engaging members 22 are used to anchor the fastener 10 to the panel 40. As will be described in detail below, the panel-engaging members 22 enable the fastener 10 to lockingly engage the panel 40 by rotational engagement of the panel-engaging members 22 of the fastener 10 to the panel 40. In other words, the panel-engaging members 22 permit the fastener 10 to twist into the opening 42 and onto the panel 40, thereby securing the fastener 10 onto the panel 40.

Figure 3:
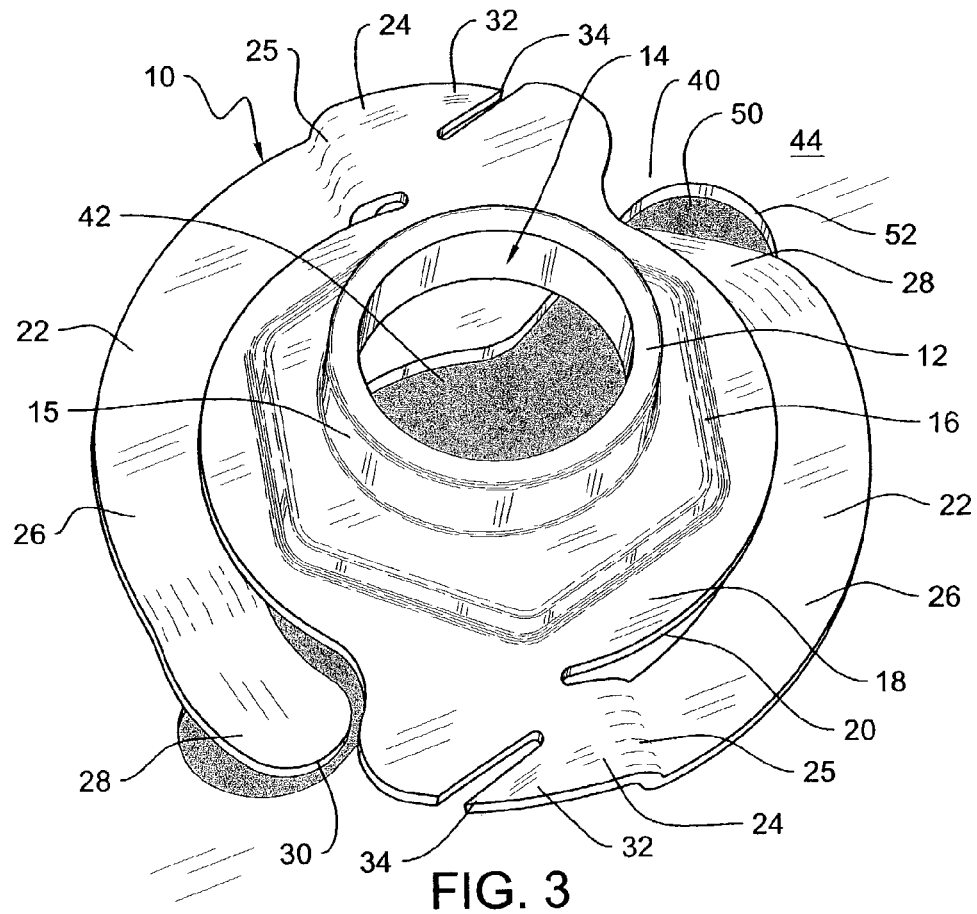
FIG. 3 shows an isometric top view of a typical installation of the fastener of FIG. 1, prior to the turning of the fastener onto the panel opening.
Figure 4:
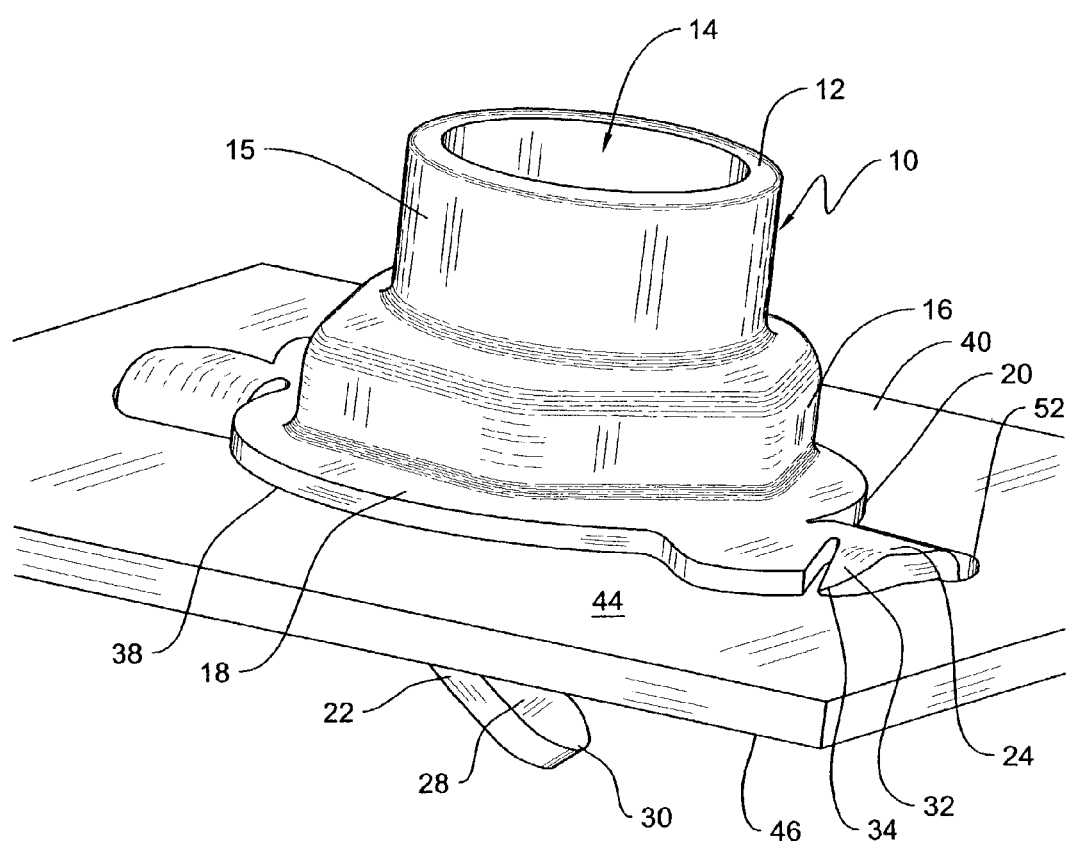
FIG. 4 shows an isometric side view of the assembly of FIG. 3 with the fastener of FIG. 1 fully installed.

The panel-engaging members 22 define a first end 24 that is formed integral with the fastener base 18. The first end 24 defines a downwardly extending portion 25 that connects to a middle portion 26, which is cantilevered from the downwardly extending portion 25. The cantilevered middle portion 26 has a resiliency that, upon installation, causes the middle portion 26 to maintain constant contact with the bottom surface wall 46 of the panel 40, as discussed below. As illustrated in FIG. 1, the middle portion 26 defines a curved shaped body that lies on a plane below the plane formed by the bottom surface 38 of the fastener base 18. The curved shaped body of the middle portion 26 substantially matches the contour of the circular shaped fastener base 18 and, as shown in FIGS. 2–4, serves as a contact surface to the bottom surface wall 46 of the panel 40. In use, the middle portion 26 prevents the fastener 10 from being pulled through the opening 42 in the panel, as described below.

The panel-engaging members 22 also define a second end 28 that includes a downwardly extending rounded end portion 30. The downwardly extending rounded end portion 30 permits the easy insertion of the panel-engaging members 22 into the opening 42 in the panel 40. One of skill in the art will understand that other shapes, configurations and numbers of panel-engaging members may be used with the invention and still achieve an object of the invention, namely, the rotational securement of the fastener onto the panel without the need for welding or yielding.

Returning to FIG. 1, the fastener base 18 further includes barbs 32 located at the peripheral edge 20 of the fastener base 18. The barbs 32 are located adjacent to the first end 24 of the panel-engaging members 22 and are formed integral with the fastener base 18. Each barb 32 defines a pointed barb end 34 that extends angularly downward. Upon installation of the fastener 10, the barbs 32 of the fastener 10 assist in securing the fastener 10 to the panel 40 by contacting and sometimes embedding into the panel wall, as shown in FIG. 4. The barbs 32 serve as an anti-rotation member to prevent the fastener 10 from backing out or withdrawing from the opening 42 upon the removal of the mating fastener. One of skill in the art will understand that other shapes and configurations of barbs or anti-rotation members, or techniques for preventing the fastener 10 from backing out of the opening 42, are possible and are considered within the scope of the invention.

Referring to FIG. 2 there is depicted a panel 40 defining an opening 42 for receiving the fastener 10. As used herein, the term "panel" includes any substrate or planar, partially planar, or non-planar material, may be part of any article of manufacture, and may be made of any metal, plastic, or other suitable panel material. The panel 40 defines a top surface 44 and bottom surface 46. The opening 42 in the panel 40 includes a circular portion 48 for providing a through-bore for permitting a mating fastener to pass through the panel 40 and engage with the fastener 10. The opening 42 also includes opposing slots 50 extending radially from the circular portion 48 for facilitating the anchoring of the fastener 10 onto the panel 40, described below. The opposing slots 50 each define a slot wall 52 that will serve as a contact surface for the fastener 10, discussed below. It is contemplated that other shapes and configurations of the opening 42 are possible with the present invention to secure the fastener 10 of the present invention onto the panel 40.

Referring to FIGS. 3 and 4, in an exemplary embodiment, there is illustrated a typical installation of the fastener 10 into the opening 42 on the panel 40. During a typical installation, the rounded end portion 30 of the panel-engaging members 22 will first be inserted into the slots 50 of the opening 42, followed by the middle portion 26 of the panel-engaging members 22. The middle portion 26 of the panel-engaging members 22 will fall below and extend across the bottom surface 46 of the panel 40 while the bottom surface 38 of the fastener base 18 will extend across the top surface 44 of the panel 40. Stated another way, the wall of the panel 40 will pass between the bottom surface 38 of the fastener base 18 and the surface of the middle portion 26 of the panel-engaging member 22. The middle portion 26 includes a resilient force directed toward the fastener base 18, which permits the panel-engaging member to maintain constant contact with the bottom surface 46 of the panel 40. With this construction, the fastener 10 is prevented from being pulled out of the opening 42 on the panel 40.

The fastener 10 is then rotated in a counterclockwise direction, either by hand or through the use of a wrench or tool that engages the plurality of facets 16 on the fastener body 12, until the fastener 10 is mechanically stopped by the slot wall 52 of the opening 42, as shown in FIG. 4. In other words, the downwardly extending portion 25 of the first end 24 of each of the panel-engaging members 22 will come in contact with the slot wall 52, thereby preventing further rotational motion of the fastener 10. A bolt or similar fastener, not shown, may then be installed into the opening 14 to fasten additional components or panels to the panel 40. The barbs 32 of the fastener 10 may bite or embed into the top surface 44 of the panel 40, or fall below the top surface 44, and will provide an additional mechanical stop for the fastener 10. The barbs 32 will serve as an anti-rotation member and will permit the bolt or other mating fastener to be loosened from the fastener 10 while at the same time preventing the fastener 10 from counter-rotating or backing out of the opening 42 in the panel 40. Significantly, the fastener 10 of the present invention is secured to the panel 40 without the use of welding or yielding.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener system for mounting to an opening in a panel, the panel defining a top and bottom surface, the fastener system comprising:

a fastener defining a fastener base and a fastener body, the fastener base including at least one panel-engaging member extending downwardly from the fastener base, the fastener base further defining at least one barb extending outwardly from the fastener base, the fastener body defining a plurality of facets on the body above the fastener base, wherein the at least one panel-engaging member extends through the opening in the panel and, upon rotational movement of the fastener, extends across the bottom surface of the panel to secure the fastener onto the panel.

2. The fastener system as set forth in claim 1, wherein the fastener includes an opening extending through the fastener.

3. The fastener system as set forth in claim 2, wherein the fastener base defines a peripheral edge, the at least one panel-engaging member extending outwardly from the peripheral edge.

4. The fastener system as set forth in claim 1, wherein the at least one panel-engaging member defines a first end formed integral with the fastener base, a downwardly extending second end, and a cantilevered middle portion positioned between the first end and second end.

5. The fastener system as set forth in claim 4, wherein the middle portion is resilient and contacts the bottom surface of the panel.

6. The fastener system as set forth in claim 1, wherein the at least one barb includes a pointed barb end extending downwardly from the fastener base.

7. A twist-in panel fastener for mounting items to a panel, the panel defining a top surface, a bottom surface, and an opening for receiving the panel fastener, the panel fastener comprising:
 a fastener body, a fastener base having at least one panel-engaging member extending from the fastener base and being cantilevered therefrom, the at least one panel-engaging member extending downwardly from the fastener base and through the opening in the panel and across the bottom surface of the panel, the fastener base having a pointed barb formed integral therewith and extending outwardly therefrom,
 wherein the at least one panel-engaging member rotatably secures the fastener to the panel.

8. The twist-in panel fastener as set forth in claim 7, wherein the fastener body includes an opening extending through the fastener body, and a plurality of facets positioned around the fastener body opening.

9. The twist-in panel fastener as set forth in claim 7, wherein the at least one panel-engaging member is a pair of panel-engaging members formed integral with the fastener base.

10. The twist-in panel fastener as set forth in claim 9, wherein each of the panel-engaging members define a first end formed integral with the fastener base, a downwardly extending second end, and a middle portion positioned between the first end and second end.

11. The twist-in panel fastener as set forth in claim 7, wherein the at least one barb includes a pointed barb end extending downwardly from the fastener base.

12. A fastener for attachment to a panel comprising:
 a fastener body including a fastener base and a pair of panel-engaging members formed integral with the fastener base and extending below the fastener base, the fastener base including at least one anti-rotation member formed as a pointed barb end extending downwardly and formed integral with the base and extending outwardly from the base, the fastener body having an opening and a plurality of facets positioned around the fastener body opening, wherein the at least one anti-rotation member is designed to prevent rotation of the fastener in the panel by engaging a top surface of the panel.

13. The fastener as set forth in claim 12, wherein the panel-engaging members are cantilevered from the fastener base.

* * * * *